United States Patent
Boisson et al.

(10) Patent No.: US 10,757,390 B2
(45) Date of Patent: Aug. 25, 2020

(54) METHOD FOR OBTAINING AT LEAST ONE SUB-APERTURE IMAGE BEING ASSOCIATED WITH ONE VIEW

(71) Applicant: INTERDIGITAL CE PATENT HOLDINGS, Paris (FR)

(72) Inventors: Guillaume Boisson, Pleumeleuc (FR); Mozhdeh Seifi, Thorigne-Fouillard (FR); Neus Sabater, Betton (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/322,958

(22) PCT Filed: Jul. 20, 2017

(86) PCT No.: PCT/EP2017/068312
§ 371 (c)(1),
(2) Date: Feb. 3, 2019

(87) PCT Pub. No.: WO2018/024490
PCT Pub. Date: Feb. 8, 2018

(65) Prior Publication Data
US 2019/0191142 A1  Jun. 20, 2019

(30) Foreign Application Priority Data
Aug. 5, 2016 (EP) .................... 16306020

(51) Int. Cl.
*H04N 13/156* (2018.01)
*G06T 5/50* (2006.01)
(Continued)

(52) U.S. Cl.
CPC ............. *H04N 13/156* (2018.05); *G06T 5/50* (2013.01); *H04N 5/22541* (2018.08);
(Continued)

(58) Field of Classification Search
CPC ............... H04N 13/156; H04N 13/246; H04N 5/22541; G06T 5/50; G06T 2200/21; G06T 2207/10052
(Continued)

(56) References Cited

U.S. PATENT DOCUMENTS 8,890,865 B2    11/2014   Park et al.
2014/0146184 A1  5/2014   Meng et al.
(Continued)

FOREIGN PATENT DOCUMENTS

CA    1319415 C    6/1993
EP    3094076 A1   11/2016
(Continued)

OTHER PUBLICATIONS

Sabater et al., "Accurate Disparity Estimation for Plenoptic Images", European Conference on Computer Vision Workshops 2014, Zurich, Switzerland, Sep. 6, 2014, pp. 548-560.
Georgiev et al., "Superresolution with the Focused Plenoptic Camera", IS&T/SPIE Electronic Imaging, San Francisco, California, USA, Jan. 23, 2011, 13 pages.
(Continued)

*Primary Examiner* — Lin Ye
*Assistant Examiner* — Chan T Nguyen
(74) *Attorney, Agent, or Firm* — Invention Mine LLC

(57) ABSTRACT

In one embodiment, it is proposed a method for obtaining at least one sub-aperture image being associated with one view, from raw light field data corresponding to recorded data by an array of pixels sensors positioned behind an array of micro-lenses in a light field camera, each of said pixel sensor recording a linear mixing of up to four different views. The method is remarkable in that it comprises applying a signal separation process on said raw data by using an inverse of a mixing matrix A, said mixing matrix comprising coefficients that convey weighting information of said up to four different views recorded by a pixel sensor.

15 Claims, 6 Drawing Sheets

(51) Int. Cl.
*H04N 13/246* (2018.01)
*H04N 5/225* (2006.01)

(52) U.S. Cl.
CPC ....... *H04N 13/246* (2018.05); *G06T 2200/21* (2013.01); *G06T 2207/10052* (2013.01)

(58) Field of Classification Search
USPC ...................................................... 348/222.1
See application file for complete search history.

(56) References Cited

U.S. PATENT DOCUMENTS

2017/0330339 A1* 11/2017 Seifi .................. G06T 7/557
2018/0047185 A1*  2/2018 Boisson ............. H04N 13/282
2018/0144492 A1*  5/2018 Vandame ............ G06T 7/557

FOREIGN PATENT DOCUMENTS

GB         2488905 B     12/2013
WO    WO 2013167758 A1  11/2013

OTHER PUBLICATIONS

Ng, R., "Digital Light Field Photography", Stanford University, Department of Computer Science, Doctor of Philosophy Thesis, Jul. 2006, pp. 1-203.

Bishop et al., "The Light Field Camera: Extended Depth of Field; Aliasing; and Superresolution", IEEE Transactions on Pattern Analysis and Machine Intelligence, vol. 34, No. 5, May 2012, pp. 972-986.

Cho et al., "Modeiing the Calibration Pipeline of the Lytro Camera for High Quality Light-Field Image Reconstruction", 2013 IEEE International Conference on Computer Vision, Sydney, Australia, Dec. 1, 2013, pp. 3280-3287.

Bok et al., "Geometric Calibration of Micro-Lens-Based Light-Field Cameras Using Line Features", European Conference on Computer Vision Workshops 2014, Zurich, Switzerland, Sep. 6, 2014, pp. 47-61.

Ng et al., "Light Field Photography with a Hand-held Plenoptic Camera", Stanford University Computer Science Technical Report,CSTR 2005-02, Apr. 2005, pp. 1-11.

Be'Ery et al., "Blind Separation of Superimposed Shifted Images Using Parameterized Joint Diagonalization", IEEE Transactions on Image Processing, vol. 17, No. 3, Mar. 2008, pp. 340-353.

* cited by examiner

METHOD FOR OBTAINING AT LEAST ONE SUB-APERTURE IMAGE BEING ASSOCIATED WITH ONE VIEW

This application claims the benefit, under 35 U.S.C. § 365 of International Application PCT/EP2017/068312, filed Jul. 20, 2017, which was published in accordance with PCT Article 21(2) on Feb. 8, 2018, in English, and which claims the benefit of European Patent Application No. 16306020.5 filed Aug. 05, 2016.

TECHNICAL FIELD

The disclosure relates to the processing of raw data obtained by a plenoptic camera (also named a light field camera).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The development of plenoptic camera that enable to perform refocusing a posteriori is a hectic research subject. In order to achieve such refocusing, it is needed to perform some shifting and adding operations on several sub-aperture images (that correspond to images of a same scene obtained from different acquisition angles at a same time, a sub-aperture image being also named a viewpoint image), as explained for example in the article entitled "*Light Field Photography with a Hand-held Plenoptic Camera*" by Ren Ng et al, in the Stanford Tech Report CTSR 2005-02. In order to obtain a sub-aperture image from raw data obtained/acquired by a plenoptic camera, usually the processing which is done consists of obtaining the same pixel under each of the micro-lenses comprised in the plenoptic camera (a micro-lens generating a micro image, also named a lenslet image), and gathering these obtained pixels in order to define a sub-aperture image. However, such processing for obtaining a set of sub-aperture images from raw data is based on the hypothesis that each sensor pixel positioned behind the microlenses array only record one viewpoint pixel image, as mentioned in the Chapter 3.3 of the Phd dissertation thesis entitled "*Digital Light Field Photography*" by Ren Ng, published in July 2006, due to the fact that the coordinates of the center of a micro-image formed by a microlens have only integer values (i.e. there is a perfect match between a micro image (or lenslet image) and the image sensors/pixels sensors). From a mathematical point of view (and in view of the FIGS. 2 and 3 in the present document), such processing from raw data to a set of sub-aperture images can be formulated as follows:

$$V_{n,m}[k,l] = R_{l,k}[m,n]$$

Where $V_{n,m}$ denotes a sub-aperture image, and $R_{l,k}$ denotes a micro-image (also noted µ-image), with $n \in [\![ 0, N-1 ]\!]$, $m \in [\![ 0, M-1 ]\!]$, $l \in [\![ 0, L-1 ]\!]$, and $k \in [\![ 0, K-1 ]\!]$.

However, it should be noted that the hypothesis previously formulated is not always verified. Indeed, the micro-image $R_{l,k}$ may be misaligned with the sensor array. Therefore, the sub-apertures images extraction process (such process is also named a demultiplexing process or also a decoding process as detailed in the article "*Accurate Disparity Estimation for Plenoptic Images*" by N. Sabater et al., published in ECCV Workshop 2014) from the raw data is not as accurate as it should be. Hence, it is necessary to improve the extraction process in order to determine correctly the set of sub-aperture images. In order to solve this issue, a technique described in the document US 2014/0146184 proposes to perform a calibration for correcting the misalignment.

The proposed technique is an alternative to the one of document US 2014/0146184.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for obtaining at least one sub-aperture image being associated with one view, from raw light field data corresponding to recorded data by an array of pixels sensors positioned behind an array of micro-lenses in a light field camera, each of said pixel sensor recording a linear mixing of up to four different views. The method is remarkable in that it comprises applying a signal separation process on said raw data by using an inverse of a mixing matrix A, said mixing matrix comprising coefficients that convey weighting information of said up to four different views recorded by a pixel sensor.

In a preferred embodiment, the method is remarkable in that said coefficients are defined according to positions, in said array of pixels, of micro-lenses images centers.

In a preferred embodiment, the method is remarkable in that said applying comprises multiplying said recorded data, represented by a column vector, by said inverse of said mixing matrix A.

In a preferred embodiment, the method is remarkable in that said signal separation is a blind signal separation.

Indeed, in one embodiment of the disclosure, it is possible to apply a blind separation technique. Indeed, such kind of technique can be efficient for recovering a sub-aperture image. Blind separation technique has been successfully applied in the processing of image data as explained in the article entitled: "*Blind separation of superimposed shifted images using parameterized joint diagonalization*" by Be'ery E. and Yeredor A., and published in IEEE Trans Image Process. 2008 March; 17(3):340-53, where blind separation of source images from linear mixtures is done.

In a preferred embodiment, the method is remarkable in that said coefficients are obtained by performing a calibration process on said light field camera.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a micro-electronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment of the disclosure, it is proposed an electronic device for obtaining at least one sub-aperture image being associated with one view, from raw light field data corresponding to recorded data by an array of pixels sensors positioned behind an array of micro-lenses in a light field camera, each of said pixel sensor recording a linear mixing of up to four different views. The electronic device comprises a memory and at least one processor coupled to the memory, and the at least one processor is remarkable in that it is configured to apply a signal separation process on said raw data by using an inverse of a mixing matrix A, said mixing matrix comprising coefficients that convey weighting information of said up to four different views recorded by a pixel sensor.

In a variant, the electronic device is remarkable in that said coefficients are defined according to positions, in said array of pixels, of micro-lenses images centers.

In a variant, the electronic device is remarkable in that said at least one processor is further configured to multiply said recorded data, represented by a column vector, by said inverse of said mixing matrix A.

In a variant, the electronic device is remarkable in that said signal separation is a blind signal separation.

In a variant, the electronic device is remarkable in that said at least one processor is further configured to perform a calibration of said light field camera in order to obtain said coefficients.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

Figure 1:
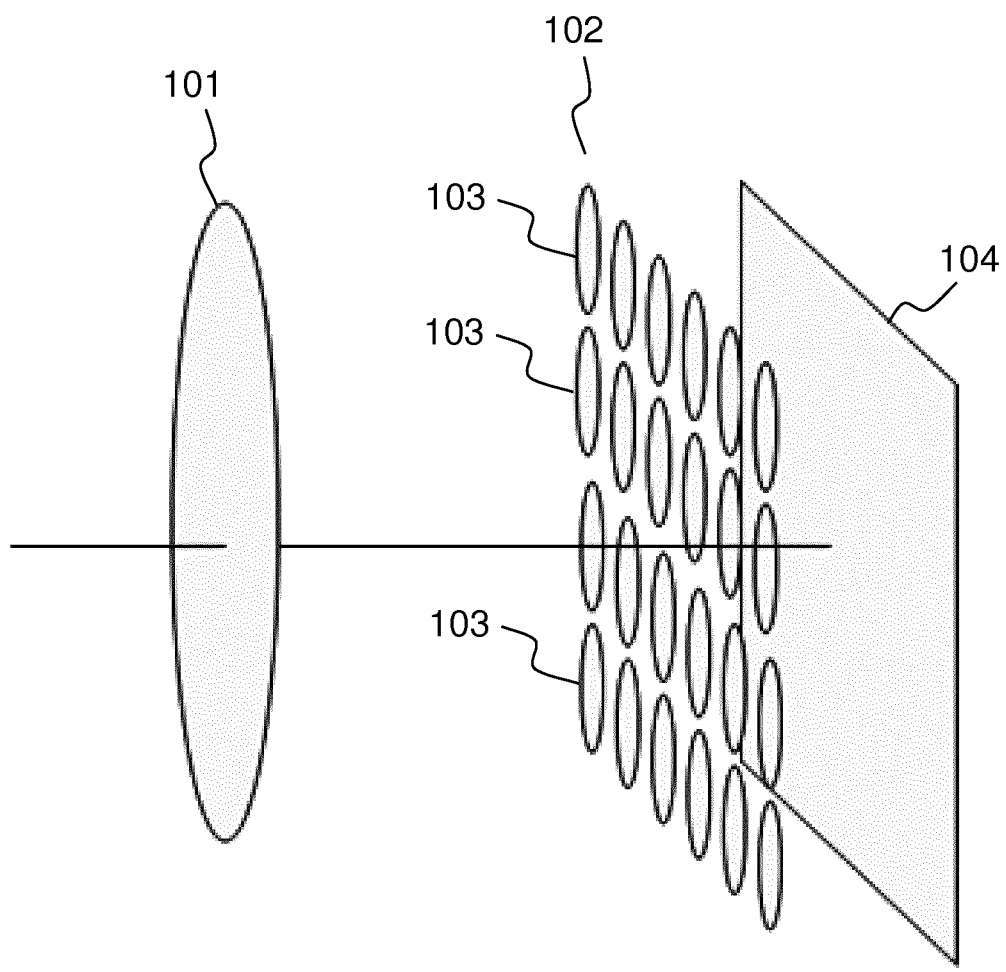
FIG. 1 presents schematically the main components comprised in a plenoptic camera that enable the acquisition of raw light field data on which the present technique can be applied.

The FIG. 1 presents schematically the main components comprised in a plenoptic camera that enable the acquisition of raw light field data on which the present technique can be applied.

More precisely, a plenoptic camera comprises a main lens referenced 101, and a sensor array (i.e., an array of pixel sensors (for example a sensor based on CMOS technology)), referenced 104. Between the main lens 101 and the sensor array 104, a micro-lens array referenced 102, that comprises a set of micro-lenses referenced 103, is positioned. It should be noted that optionally some spacers might be located between the micro-lens array around each lens and the sensor to prevent light from one lens to overlap with the light of other lenses at the sensor side. In one embodiment, all the micro-lenses have the same focal. In another embodiment, the micro-lens can be classified into at least three groups of micro-lenses, each group being associated with a given focal, different for each group. Moreover, in a variant, the focal of a micro-lens is different from the ones positioned at its neighborhood; such configuration enables the enhancing of the plenoptic camera's depth of field. It should be noted that the main lens 101 can be a more complex optical system as the one depicted in FIG. 1 (as for example the optical system described in FIGS. 12 and 13 of document GB2488905) Hence, a plenoptic camera can be viewed as a conventional camera plus a micro-lens array set just in front of the sensor as illustrated in the FIG. 1. The light rays passing through a micro-lens cover a part of the sensor array that records the radiance of these light rays. The recording by this part of the sensor defines a micro-lens image.

More details related to plenoptic camera can be found out in the Section 4 entitled "Image formation of a Light field camera" in the article entitled "*The Light Field Camera: Extended Depth of Field, Aliasing, and Super resolution*" by Tom E. Bishop and Paolo Favaro, published in the IEEE Transactions on Pattern Analysis and Machine Intelligence, Vol. 34, N°5, in May 2012.

Figure 2:
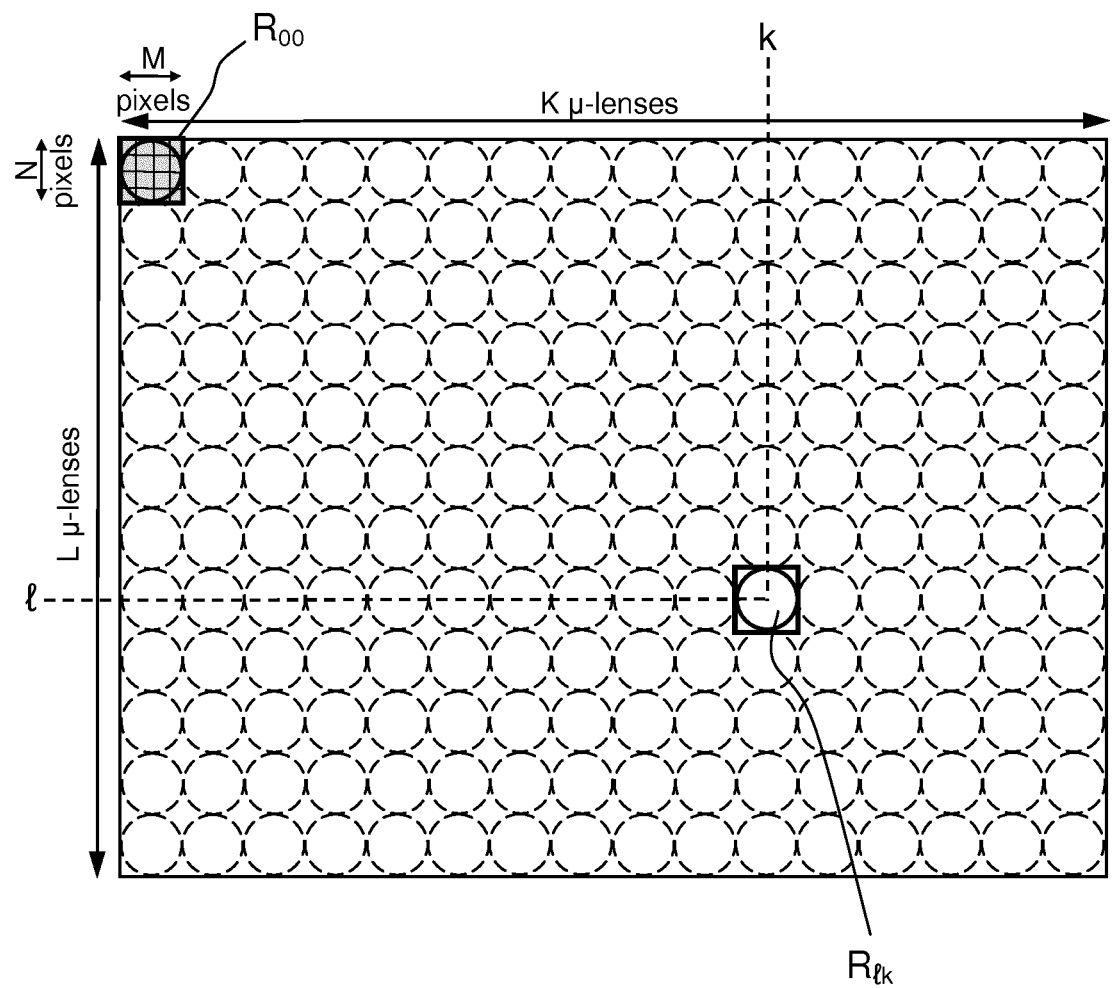
FIG. 2 presents, in a schematic way, a micro-lens array comprising K·L micro-lenses comprised in a plenoptic camera.
Figure 3:
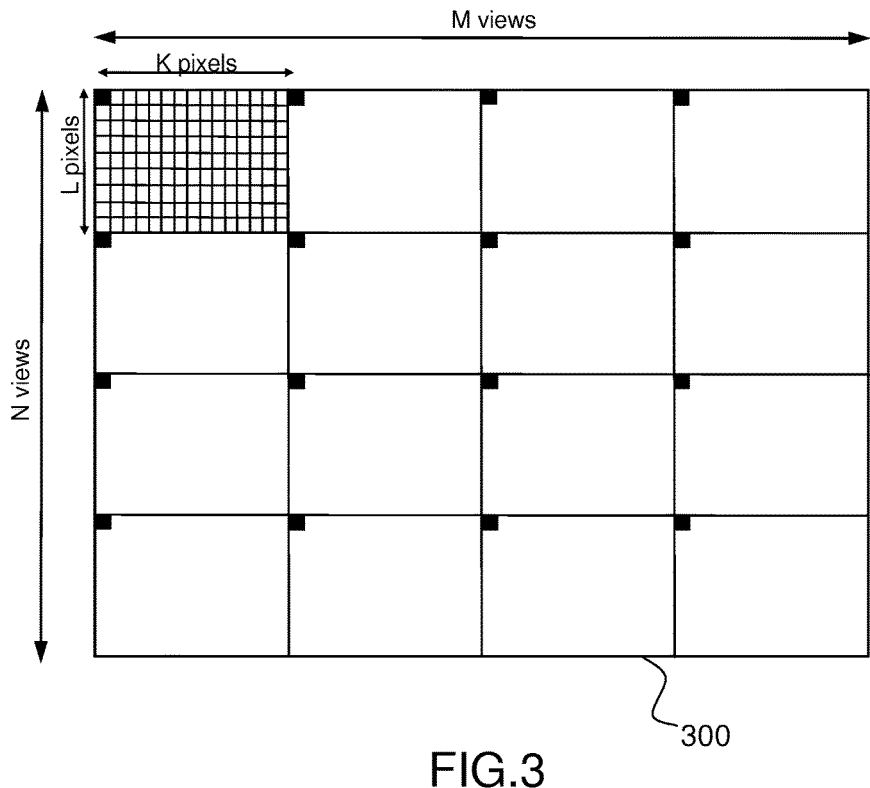
FIG. 3 presents a set of sub-aperture images (also named a matrix of views) obtained from the demultiplexing process applied on raw data acquired by a plenoptic camera.

The FIG. 2 presents, in a schematic way, a micro-lens array comprising K·L micro-lenses (i.e. an array of L rows of micro-lenses and K columns of micro-lenses), and each micro-lens is associated with a part of the pixel sensors array. For example, such part of the pixel sensors array can be a rectangular comprising M·N pixel sensors. Usually, the light rays passing through a micro-lens defines/generates a micro-image that is recorded within the part of the pixel sensors array associated with said micro-lens. Indeed, by malapropism, the micro-image and this part of the pixel sensors are considered as equivalent terms. Hence, for example $R_{l,k}$ denotes a micro-image (also noted µ-image) positioned at row referenced l, and column referenced k. Therefore, it is possible to obtain from raw data (corresponding to the data recorded by the L·K·N·M pixels that are positioned below/under the K·L microlenses), a number of N·M sub-aperture images, each sub-aperture image comprising K·L pixels (as depicted in the FIG. 3, which represents a set (referenced 300) of sub-aperture images; such set is also named a matrix of views in the prior art).

For reminders, a sub-aperture image corresponds to an image of the object space from a given view (i.e. it can be viewed as a sampling of the pupil). In theory, when the micro-lens array and the pixel sensor array are perfectly aligned, the pixels from the raw data and the pixels from the sub-aperture images are linked by the following equation:

$$V_{n,m}[k,l]=R_{l,k}[m,n]$$

where $V_{n,m}$ denotes a sub-aperture image positioned at row referenced n and column referenced m in the matric of views referenced 300, and $R_{l,k}$ denotes a micro-image (also noted µ-image). Hence $V_{n,m}[k, l]$ corresponds to the pixel located at position (k,l) in the sub-aperture image $V_{n,m}$.

It should be noted that rearranging µ-images into sub-aperture images requires to know precisely the location of the µ-images. In the following we denote $(c_{k,l}^x, c_{k,l}^y)$ the coordinates of the µ-center $c_{k,l}$ i.e. the center of the µ-image (k,l).

In the literature, most approaches propose de-mosaicking of the raw sensor image at first step, before having any insight of the scene geometry. This induces irrelevant inter-polations between samples within µ-images. To circumvent this, disparity-guided de-mosaicking has been proposed in the article entitled "*Accurate Disparity Estimation for Plenoptic Images*" by Neus Sabater et al., published in the conference proceedings of the Workshop on Light Fields for Computer Vision, ECCV 2014, but that solution relies on nearest integer coordinates, which lessens the accuracy of the reconstructed sub-aperture images.

It is proposed a new approach to the generation of matrices of views that handles sub-pixel position for µ centers and plenoptic samples, while keeping interpolations consistent with physics.

Figure 4:
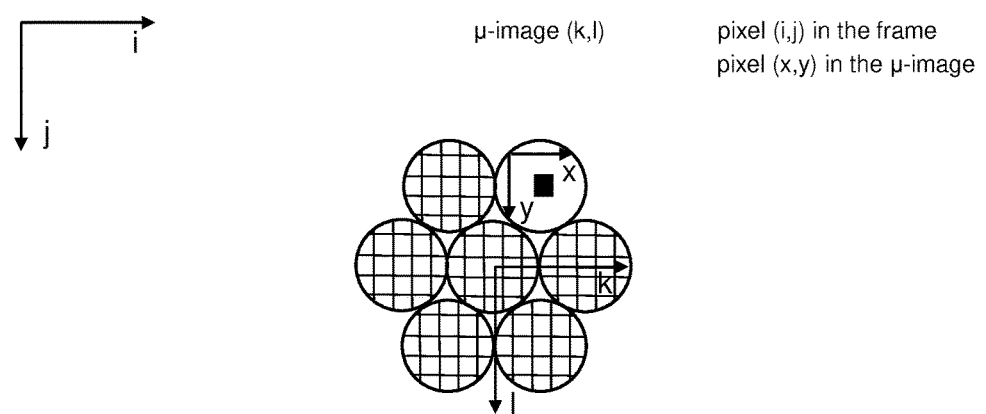
FIG. 4 presents, based on a schematic representation of the pixel sensors array, the terminology and notations that is used to described one embodiment of the disclosure.

The FIG. 4 presents, based on a schematic representation of the pixel sensors array, the terminology and notations that is used to described one embodiment of the disclosure.

Indeed, in view of the FIG. 4, the following notation is used:

coordinates (i,j) correspond to horizontal and vertical integer coordinates in the raw sensor picture;

coordinates (k,l) corresponds to horizontal and vertical indices of a µ-image;

coordinates (m,n) correspond to horizontal and vertical indices of a sub-aperture image;

coordinates (x,y) correspond to horizontal and vertical real (a priori non-integers) coordinates in a µ image.

Besides, the following integers are defined:

K and L respectively denote the width and height of the µ-lens array. In the case of hexagonal patterns, one dimension is doubled so that every lens presents integer indices.

W and H respectively denote the width and height of the sensor.

M and N respectively denote the width and height of a µ image. In the case of a square pattern, $$M = \left\lfloor \frac{W}{K} \right\rfloor \text{ and } N = \left\lfloor \frac{H}{L} \right\rfloor,$$

where $\lfloor . \rfloor$ denotes the floor function. In the case of a row-major hexagonal pattern, note that $$M = \left\lfloor \frac{2W}{K} \right\rfloor.$$

in we case of a column-major hexagonal pattern, note that $$N = \left\lfloor \frac{2H}{L} \right\rfloor.$$

Usually, camera calibration provides the positions of μ centers $\{(c_{k,l}^x, c_{k,l}^y) \in \mathbb{R}^2\}_{1 \le l \le L}^{1 \le k \le K}$. These positions are a priori not integers.

Pixels positions (i,j) can be turned into:

The indices (k,l) of the μ image they belong;

their relative (a priori non-integer) position $(x,y) \in \mathbb{R}^2$ with regards to corresponding μ-centers $(c_{k,l}^x, c_{k,l}^y)$.

Pixels also have a color channel (Red or Green or Blue, or Lightness, or Infra-red or whatever) and an intensity.

Figure 5A:
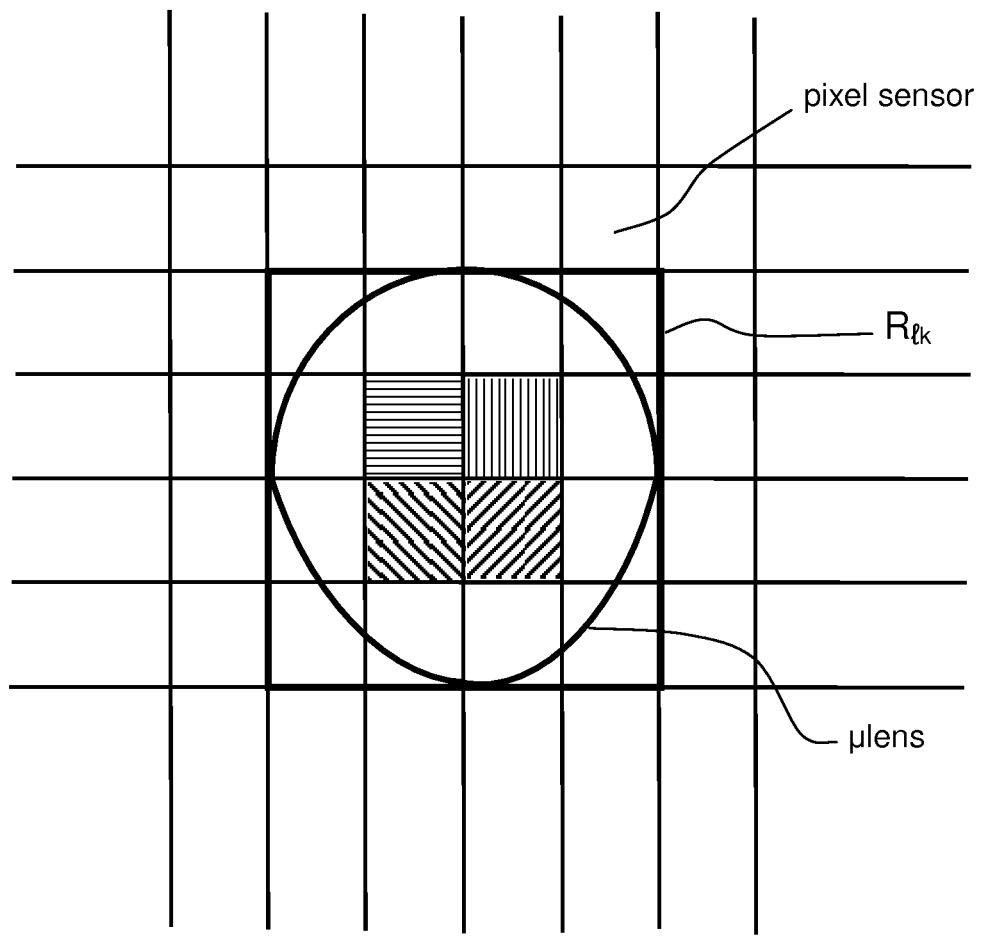
FIGS. 5(A) and (B) focus on views recorded by a pixel in relation with the position of a micro-lens.
Figure 5B:
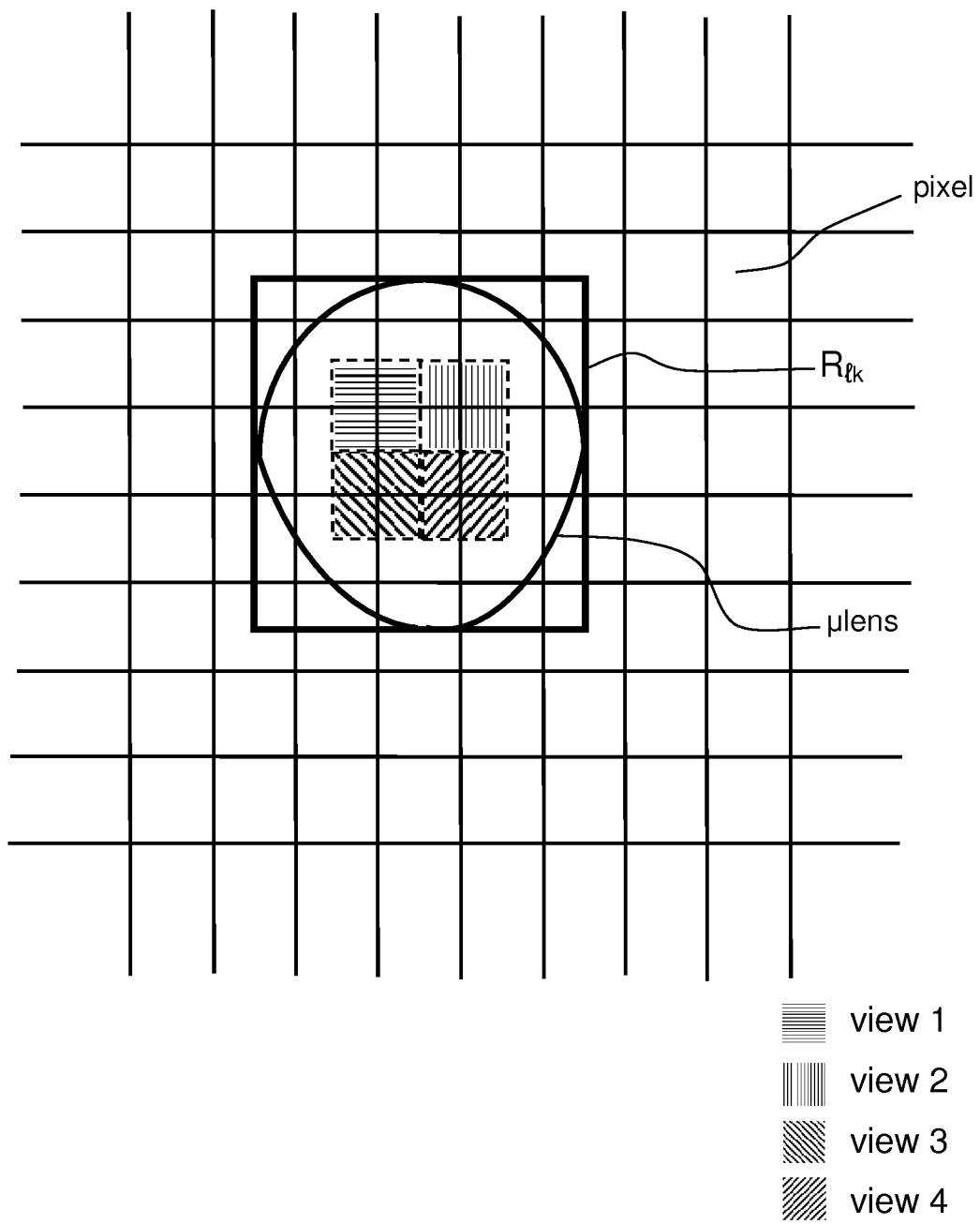

In the ideal case, each pixel of the sensor is associated with a unique view as detailed for example in the FIG. 5(A) which focuses on the μ-image $R_{kl}$, where for example it is shown that a unique view is associated with (or recorded by) a pixel. However, in the coordinate system relative to the μ-image, pixels have a priori non-integer coordinates. Physically, this means that pixels integrate photons originating from different parts of the pupil that are sampled in separate views. For example, in the FIG. 5(B), it is depicted another plenoptic camera in which a pixel receives and records the contribution of several different views. In the worst case (as presented in the FIG. 5(B)), a pixel records information coming from up to four different views.

Therefore, by formalizing and generalizing this observation, it appears that a relationship (also called equation 1 in the following) linking the raw data (i.e. the data recorded by the pixels) and sub-aperture images can be established:

$$R(i,j) = \alpha\beta \cdot V_{\lfloor y \rfloor, \lfloor x \rfloor}(k,l) + \alpha\bar{\beta} \cdot V_{\lceil y \rceil, \lfloor x \rfloor}(k,l) + \bar{\alpha}\beta \cdot V_{\lfloor y \rfloor, \lceil x \rceil}(k,l) + \bar{\alpha}\bar{\beta} \cdot V_{\lceil y \rceil, \lceil x \rceil}(k,l),$$ with again:

R denoting the raw sensor picture;

$(i,j) \in \mathbb{N}^2$ the pixel position in the raw picture;

$(k,l) \in \mathbb{N}^2$ the corresponding the μ-image indices in the raw picture;

$(x,y) \in \mathbb{R}^2$ the relative (a priori non-integer) pixel coordinates in the μ-image with regards to μ-center position $(c_{k,l}^x, c_{k,l}^y) \in \mathbb{R}^2$.

$\lfloor . \rfloor$ and $\lceil . \rceil$ respectively denoting floor and ceiling functions, and where $\alpha = x - \lfloor x \rfloor$ and $\bar{\alpha} = 1 - \alpha = \lceil x \rceil - x$ $\beta = y - \lfloor y \rfloor$ and $\bar{\beta} = 1 - \beta = \lceil y \rceil - y$ Now let us consider both the raw image and the matrix of views as (KLMN-row vectors.

Let also m and n respectively denote the integer parts of x and y: $m = \lfloor x \rfloor$ and $n = \lfloor y \rfloor$ We can write down equation 1 as a matrix product:

$$R = A \cdot V$$

$$\begin{pmatrix} \vdots \\ R[i,j] \\ \vdots \end{pmatrix} = \begin{pmatrix} & & \cdots & & \\ \cdots & \alpha\beta & \cdots & \bar{\alpha}\beta & \cdots & \alpha\bar{\beta} & \cdots & \bar{\alpha}\bar{\beta} & \cdots \\ & & \cdots & & \end{pmatrix} \cdot \begin{pmatrix} \vdots \\ V_{n,m}[k,l] \\ \vdots \\ V_{n,m+1}[k,l] \\ \vdots \\ V_{n+1,m}[k,l] \\ \vdots \\ V_{n+1,m+1}[k,l] \\ \vdots \end{pmatrix}.$$

With $R[i,j]$ being the $(j \cdot KM + i)^{th}$ line of vector R $V_{n,m}[k,l]$ being the $((n \cdot L + l) \cdot KM + (m \cdot K + k))^{th}$ line of vector V And A being a square KLMN×KLMN matrix.

Some remarks concerning the matrix A can be done:

the matrix A is sparse; indeed, each line of A presents at most four (possibly two or one only) nonzero coefficients;

the matrix A is invertible and its rank is KLMN. Note the size of A is not necessarily W×H. Some lines must be removed if they correspond to black pixels that don't belong to any μ-image.

In the monochrome case, sub-aperture images can be recovered straightforwardly:

$$A^{-1} \cdot R = V$$

In the RGB case, R can be considered a KLMN×3 vector, whose coefficients are only partially known:

$$R = \begin{pmatrix} \vdots \\ ? & g & ? \\ ? & ? & b \\ r & ? & ? \\ \vdots \end{pmatrix}$$

In this case, color planes of the sub-aperture images can only be partially recovered, and de-mosaicking is performed.

In one embodiment of the disclosure, the coefficients of the mixing matrix A can be obtained from a calibration process.

Figure 6:
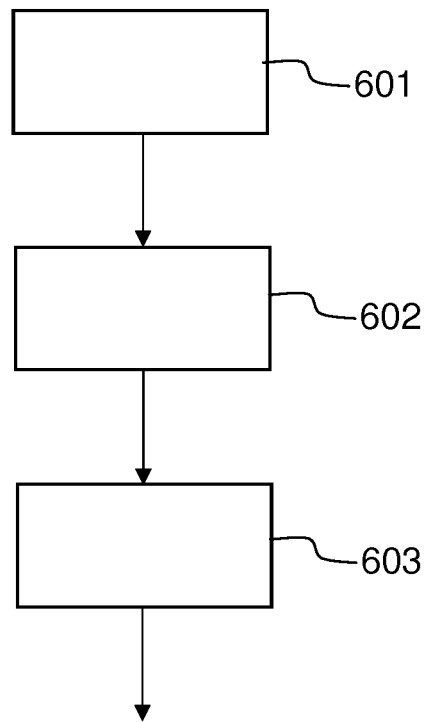
FIG. 6 depicts a method for obtaining at least one sub-aperture image from raw data acquired by a plenoptic camera, according to one embodiment of the disclosure.

The FIG. 6 depicts a method for obtaining at least one sub-aperture image from raw data acquired by a plenoptic camera, according to one embodiment of the disclosure.

In a step, referenced 601, an electronic device obtains either a mixing matrix A or an inverse of said mixing matrix, said mixing matrix comprising coefficients that convey weighting information (related to different views) that details proportion of views recorded by a pixel sensor.

In a step referenced 602, the electronic device executes a signal separation process on said raw data by using an inverse of a mixing matrix A. Hence, in the case that in step 601, only the mixing matrix is obtained, an inversion step has to be done by said electronic device.

Then, in a step referenced 603, the electronic device generates a matrix of views or a set of sub-aperture images to be stored on a memory unit and/or to be transmitted to another electronic device.

Figure 7:
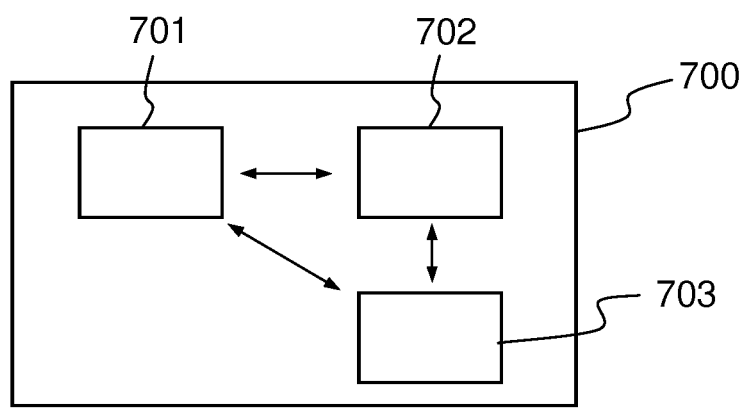
FIG. 7 presents an example of a device that can be used to perform one or several steps of methods disclosed in the present document.

The FIG. 7 presents an example of an electronic device that can be used to perform one or several steps of methods disclosed in the present document.

Such device referenced 700 comprises a computing unit (for example a CPU, for "Central Processing Unit"), referenced 701, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 702. Computer programs are made of instructions that can be executed by the computing unit. Such device 700 can also comprise a dedicated unit, referenced 703, constituting an input-output interface to allow the device 700 to communicate with other devices. In particular, this dedicated unit 703 can be connected with an antenna (in order to perform communication without contacts), or with serial ports (to carry communications "contact"). It should be noted that the arrows in the FIG. 7 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 7.

The invention claimed is:

1. A method comprising: recording raw light field data by an array of pixel sensors positioned behind an array of micro-lenses in a light field camera, wherein each pixel sensor records a linear mixing of up to four different views
obtaining at least one sub-aperture image associated with one view by applying a signal separation process on the raw data by using an inverse of a mixing matrix A, wherein the mixing matrix A comprises coefficients that convey weighting information of the up to four different views, and wherein the mixing matrix A is representative of a relationship between the data recorded by the array of pixel sensors and the at least one sub-aperture image.

2. The method according to claim 1, wherein the coefficients are defined according to positions, in the array of pixels, of micro-lenses images centers.

3. The method according to claim 1, wherein the applying comprises multiplying the recorded data, represented by a column vector, by the inverse of the mixing matrix A.

4. The method according to claim 1, wherein the signal separation is a blind signal separation.

5. The method according to claim 1, wherein the coefficients are obtained by performing a calibration process on the light field camera.

6. A non-transient storage medium storing a computer program comprising a set of computer-executable instructions to implement the method according to claim 1 wherein the instructions are executed by a computer.

7. An electronic device comprising a memory and at least one processor coupled to the memory, wherein the at least one processor is configured to: record raw light field data by an array of pixels sensors positioned behind an array of micro-lenses in a light field camera, wherein each pixel sensor records a linear mixing of up to four different views;
obtain at least one sub-aperture image associated with one view by applying a signal separation process on the raw data by using an inverse of a mixing matrix A, wherein the mixing matrix A comprises coefficients that convey weighting information of the up to four different views, and wherein the mixing matrix A is representative of a relationship between the data recorded by the array of pixel sensors and the at least one sub-aperture image.

8. The electronic device according to claim 7, wherein the coefficients are defined according to positions, in the array of pixels, of micro-lenses images centers.

9. The electronic device according to claim 7, wherein the at least one processor is further configured to multiply the recorded data, represented by a column vector, by the inverse of the mixing matrix A.

10. The electronic device according to claim 7, wherein the signal separation is a blind signal separation.

11. The electronic device according to claim 7, wherein the at least one processor is further configured to perform a calibration of the light field camera in order to obtain the coefficients.

12. The electronic device according to claim 7, wherein the coefficients that convey weighting information detail proportion of the up to four different views recorded by the first pixel sensor.

13. The method according to claim 1, wherein the coefficients that convey weighting information detail proportion of the up to four different views recorded by the first pixel sensor.

14. A method comprising:
recording, by an array of pixel sensors, raw light field data representative of an image through an array of micro-lenses, wherein each pixel sensor of the array of pixel sensors records data comprising a linear mixing of up to four different views of the image;
obtaining at least one sub-aperture image associated with one view of the image by applying a signal separation process on the raw data by using an inverse of a mixing matrix A, wherein the mixing matrix A comprises coefficients that convey weighting information of the up to four different views, and wherein the mixing matrix A is representative of a relationship between the data recorded by the array of pixel sensors and the at least one sub-aperture image.

15. The method according to claim 14, wherein the coefficients that convey weighting information detail proportion of the up to four different views.

* * * * *